US011091617B2

(12) United States Patent
Bernreitner et al.

(10) Patent No.: US 11,091,617 B2
(45) Date of Patent: Aug. 17, 2021

(54) POLYPROPYLENE COMPOSITION

(71) Applicant: BOREALIS AG, Vienna (AT)

(72) Inventors: Klaus Bernreitner, Linz (AT); Martina Sandholzer, Linz (AT); Stefan Hellstrom, Kungalv (SE); Bert Broeders, Beringen (BE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/345,633

(22) PCT Filed: Nov. 7, 2017

(86) PCT No.: PCT/EP2017/078448
§ 371 (c)(1),
(2) Date: Apr. 26, 2019

(87) PCT Pub. No.: WO2018/087077
PCT Pub. Date: May 17, 2018

(65) Prior Publication Data
US 2019/0270871 A1 Sep. 5, 2019

(30) Foreign Application Priority Data
Nov. 9, 2016 (EP) ..................................... 16197913

(51) Int. Cl.
| C08L 23/14 | (2006.01) |
| C08K 3/013 | (2018.01) |
| C08K 5/3435 | (2006.01) |
| C08K 5/3492 | (2006.01) |
| C08K 5/32 | (2006.01) |
| C08L 23/16 | (2006.01) |
| B32B 27/18 | (2006.01) |

(52) U.S. Cl.
CPC .............. *C08L 23/14* (2013.01); *C08K 3/013* (2018.01); *C08K 5/32* (2013.01); *C08K 5/3435* (2013.01); *C08K 5/34926* (2013.01); *C08L 23/16* (2013.01); *B32B 27/18* (2013.01); *C08L 2203/16* (2013.01); *C08L 2207/02* (2013.01)

(58) Field of Classification Search
CPC .. B32B 5/16; B32B 5/30; B32B 27/20; B32B 27/08; B32B 27/06; B32B 27/32; B32B 2307/732; B32B 27/18; B32B 2439/00; B32B 2307/4026; B32B 2307/71; B32B 2437/00; B32B 2262/101; B32B 2264/10; B32B 2605/00; B32B 2307/3065; C08K 5/3435; C08K 5/32; C08K 3/013; C08K 5/34926; C08L 23/14; C08L 2207/02; C08L 2203/16
See application file for complete search history.

(56) References Cited

U.S. PATENT DOCUMENTS

| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 5,539,067 A | 7/1996 | Parodi et al. |
| 5,618,771 A | 4/1997 | Parodi et al. |
| 2003/0060543 A1* | 3/2003 | Seip et al. ........... C08K 5/3435 524/87 |
| 2003/0065065 A1* | 4/2003 | Urata et al ................ C08K 5/16 524/99 |
| 2008/0220193 A1* | 9/2008 | Tohi ........................ C08F 10/00 428/36.92 |
| 2009/0298964 A1* | 12/2009 | Jacob et al. ............ C08L 23/10 522/78 |
| 2016/0280900 A1* | 9/2016 | Purmonen ............... C08L 23/14 |
| 2019/0382567 A1* | 12/2019 | Sandholzer ........... H01L 31/049 |

FOREIGN PATENT DOCUMENTS

| CN | 1121362 A | 4/1996 |
| CN | 1195671 A | 10/1998 |
| CN | 101970568 A | 2/2011 |
| CN | 105579503 A | 5/2016 |
| EP | 0045975 A2 | 2/1982 |
| EP | 0045976 A2 | 2/1982 |
| EP | 0045977 A2 | 2/1982 |
| EP | 491556 A3 | 11/1992 |

(Continued)

OTHER PUBLICATIONS https://www.sigmaaldrich.com/catalog/product/aldrich/533963?lang=en&region=US&gclid=Cj0KCQjwreT8BRDTARIsAJLI0KIArba69REehGQQtRkiGI3QBVpic6lzVZcDLBeLyWwZ47VLyERoInYaAp5QEALw_wcB (Year: 2020).*

(Continued)

*Primary Examiner* — Marc S Zimmer
(74) *Attorney, Agent, or Firm* — Tarolli, Sundheim, Covell & Tummino LLP

(57) ABSTRACT

The present invention relates to a polymer composition, to a use of the polymer composition for producing an article, to an article comprising the polymer composition, preferably to an article which comprises a layer element comprising at least one layer which comprises the polymer composition.

13 Claims, No Drawings

(56) References Cited

FOREIGN PATENT DOCUMENTS

| | | |
|---|---|---|
| EP | 586390 B1 | 3/1994 |
| EP | 591224 B2 | 4/1994 |
| EP | 0887379 B1 | 12/1998 |
| EP | 2610271 A1 | 7/2013 |
| ES | 2367239 T3 | 10/2011 |
| JP | S62260842 A | 11/1987 |
| JP | 05-111233 A | 11/1991 |
| JP | H08509031 A | 9/1996 |
| JP | H09262892 A | 10/1997 |
| JP | 2004515658 A | 5/2004 |
| JP | 2017518631 A | 7/2017 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 92/19659 A1 | 11/1992 |
| WO | 92/21705 A1 | 12/1992 |
| WO | 93/11165 A1 | 6/1993 |
| WO | 93/11166 A1 | 6/1993 |
| WO | 93/19100 A1 | 9/1993 |
| WO | 95/32994 A1 | 12/1995 |
| WO | 97/36939 A1 | 10/1997 |
| WO | 98/12234 A1 | 3/1998 |
| WO | 99/24478 A1 | 5/1999 |
| WO | 99/24479 A1 | 5/1999 |
| WO | 99/33842 A1 | 7/1999 |
| WO | 00/68315 A1 | 11/2000 |
| WO | 02/096985 A1 | 12/2002 |
| WO | 03/000754 A1 | 1/2003 |
| WO | 03/000755 A1 | 1/2003 |
| WO | 03/000756 A1 | 1/2003 |
| WO | 03/000757 A1 | 1/2003 |
| WO | 2004/000899 A1 | 12/2003 |
| WO | 2004/029112 A1 | 4/2004 |
| WO | 2004/111095 A1 | 12/2004 |
| WO | 2009/154866 A2 | 12/2009 |
| WO | 2012/007430 A1 | 1/2012 |
| WO | 2015/173315 A1 | 11/2015 |
| WO | 2015173175 A1 | 11/2015 |
| WO | 2015713175 A1 | 11/2015 |
| WO | 2016080143 A1 | 5/2016 |

OTHER PUBLICATIONS

"Photooxidation of unstabilised and HALS-stabilised Polyphasic Ethylene-propylene Copolymers" authored by Delprat et al. and published in Polymer Degradation and Stability (1995) 50 (1), 1-12.*
Abstract for CN 102786741 (Jul. 2012).*
Machine translation of CN 102786741 (no date).*
Voigt, et al. "New approaches to the melt stabilization of polyolefins", Polymer Degradation and Stability 77 (2002) 397-402.
Zweifel, et al., "Plastics Additives Handbook", 5th Edition, Department of Materials, Institute of Polymers, 2001.
Extended European Search Report for Application No. 16197913. 3-1308.
Japanese Office Action for Application No. 2019-518950 dated May 26, 2020.
Chinese Office Action for Application No. 201780066310.5 dated Jul. 29, 2020.
Japanese Decision of Rejection Office Action for Application No. 2019-518950 dated Jun. 15, 2021; 7 pgs.

* cited by examiner

POLYPROPYLENE COMPOSITION

The present invention relates to a polymer composition, to a use of the polymer composition for producing an article, to an article comprising the polymer composition, preferably to an article which comprises a layer element comprising at least one layer which comprises the polymer composition.

BACKGROUND ART

In certain end use applications, e.g. outdoor end use, the mechanical properties of the polymeric articles have special requirements. The polymeric material must e.g. withstand UV light which can be severe in some geographical regions. Moreover, at outdoor end use the temperature can vary within wide range. Therefore also long-term thermal stability, especially at high temperatures, is often required.

Usually articles produced using polymer material, like polypropylene (PP) polymer, require additives to provide the UV stability and long-term temperature stability.

Hindered amine light stabilising compounds are known to be very effective in providing UV light resistance to the polymer material. The common approach to reach long-term temperature stability e.g. in hot water pipes is to use a special combination of phenolic antioxidants. Phenolic antioxidants are very effective as long term temperature stabilising agents compared non-phenolic antioxidants, however the use of phenolic antioxidants can change the visual appearance of the article, namely the phenolic antioxidants have often a discoloring effect on the original shade of the article, which is not desirable in certain end applications wherein the original visual appearance should be maintained.

Accordingly, there is a continuous need for polymer solutions for demanding end applications wherein UV light stability and long-term thermal stability are required without scarifying the original visual appearance of the end article.

THE DESCRIPTION OF THE INVENTION

Accordingly, the present invention is directed to a polypropylene composition comprising (i) more than 25 wt %, preferably from 30 to 99.8 wt % of a polymer of propylene (PP), and (ii) 0.2 to 5 wt % of additives;

based on the total amount (100 wt %) of the polypropylene composition;

wherein the additives (ii) are selected at least from (iia) UV stabiliser(s) which is at least a hindered amine compound and (iib) antioxidant which is at least a dialkyl amine compound, and wherein the additives (ii) are without phenolic unit(s).

"Based on the total amount (100 wt %) of the polymer composition of the invention" means that the amounts of the components present in the polymer composition total to 100 wt %.

The polypropylene composition of the invention is referred herein also as e.g. "PP composition", "composition" or "composition of the invention". The "(i) polymer of propylene (PP)" is referred herein also as "PP polymer" or "PP polymer (i)". The terms "(ii) additives", "(iia) UV stabiliser(s) which is at least a hindered amine compound" and "(iib) antioxidant which is at least a dialkyl amine compound" as specified above and in claims are referred herein respectively also as "additives (ii)", "UV stabiliser(s) (iia)" and "antioxidant (iib)".

The hindered amine compound means hindered amine light stabilising compound (HALS compound) which term has well known and generally acknowledged meaning.

The expression "the additives (ii) are without phenolic unit(s)" means that any additive compound including UV stabiliser(s) (iia) and antioxidant (iib) present in the composition bears no phenolic units.

Preferably, in addition to additives (ii), the composition does not comprise any other components with phenolic units. This means that components with phenolic units may only be present in the composition in very low, but still detectable amounts of less than 500 ppm, more preferably less than 100 ppm, and most preferably less than 20 ppm as contaminants or by-products.

The polypropylene composition of the invention wherein PP polymer (i) is combined with the specific UV stabiliser(s) (iia) and specific antioxidant (iib) of the invention, and wherein additive(s) (ii) are free from phenolic units added to the polypropylene composition, gives surprisingly good UV stability and long-term thermostability properties. Unexpectedly, the long-term thermostability (also called long-term temperature stability) is at least comparable to that obtained when using phenolic antioxidants which are considered in the state of art as providing superior long term thermostability properties. Without binding to any theory it is believed that the present combination of UV stabiliser(s) (iia) and specific antioxidant (iib) of the invention have synergistic effect providing the unexpectedly good thermostability and at the same time UV stability. The long-term themostability is expressed herein as % of tensile strength retention after certain ageing time at a given temperature.

Moreover, the polypropylene composition of the invention with the specific combination of additives has preferably no or markedly decreased effect on the original visual appearance, namely does not cause any or only minimal tinting to the original shade of the article compared to phenolic antioxidants. The desirable non-tinting effect on the original visual appearance remains preferably also e.g. in applications wherein the polypropylene composition of the invention is laminated with other polymeric materials or is used in extrusion coating applications.

The property balance provided by the specific combination of additives with PP polymer (i) makes the composition of the invention highly feasible for various end applications, particularly for producing articles for outdoor end use. Preferably, the composition is highly useful in articles for outdoor use where the article is exposed to sun light and also may be exposed to high and/or low temperatures, or marked temperature changes.

Accordingly the invention further provides a use of the polypropylene composition of the invention as defined above or below or in claims for producing an article.

The invention is further directed to an article comprising the polymer composition of the invention, as defined above or below or in claims.

The preferred article comprises a layer element which comprises at least one layer, i.e. one or more layer(s), comprising the polymer composition of the invention, as defined above or below or in claims.

Herein the definitions "layer element of the invention comprising (or which comprises) at least one layer comprising (or which comprises) the polymer composition of the invention" and "at least one layer of the layer element of the invention comprising (or which comprises) the polymer composition of the invention" are used herein interchangeably to refer the layer(s) and/or the layer element of the invention, as evident from the context.

In one embodiment the article is a layer element comprising at least one layer which comprises the polymer composition of the invention, as defined above or below or in claims. This embodiment is referred herein also as "layer element" or "layer element comprising at least one layer which comprises the polymer composition" of the invention.

Preferably the layer element is a monolayer element or a multilayer element comprising at least one layer comprising the polymer composition of the invention.

Accordingly, in case the layer element is a monolayer element, then the "at least one" layer, i.e. the monolayer element, comprises the composition of the invention. In case of a multilayer element, the expression "at least one layer" of a layer element means that said element comprises two or more layers, wherein at least one layer comprises the polymer composition of the invention. The other layer(s) may comprise different layer material(s) or may comprise the polymer composition of the invention. It is evident that the material of the other layers of a multilayer element may vary and can be chosen by a skilled person depending on the desired end application.

Moreover, the invention provides an article which comprises a layer element comprising at least one layer which comprises the polymer composition of the invention, preferably, wherein the layer element is selected from
 a monolayer element comprising the polypropylene composition of the invention, or
 a multilayer element wherein at least one layer comprises the polypropylene composition of the invention.

Moreover, the invention provides an article which is a film selected from
 a monolayer film comprising the polypropylene composition as defined above, below or in claims, or
 a multilayer film wherein at least one layer comprises the polypropylene composition as defined above, below or in claims.

Furthermore, the invention provides an article which is a multilayer assembly comprising two or more layer elements, wherein at least one layer element is a layer element comprising at least one layer which comprises the polymer composition according to invention. Preferably, the layer element is selected from
 a monolayer element comprising the polypropylene composition as defined above, below or in claims, or
 a multilayer element wherein at least one layer comprises the polypropylene composition as defined above, below or in claims.

The layer element of the invention is suitable to be combined with other polymeric, preferably other polyolefinic, layer elements.

Preferably, said at least one layer of the layer element of the article of the invention comprises at least 70 wt %, preferably at least 80 wt %, preferably at least 90 wt %, preferably 90 to 100 wt %, suitably consists of, the polymer composition of the invention.

The composition of the invention, the PP polymer and the article are described below and in claims with further details, preferred embodiments, ranges and properties, which preferred embodiments, ranges and properties can be in any combination and combined in any order.

Polypropylene Composition of the Invention and Components Thereof

The components and amounts of the polymer composition can be chosen to optimize the property balance desired for an end application, as evident for a skilled person.

The composition of the invention comprises as additives (ii) at least one or more UV stabiliser(s) (iia) and one or more antioxidant(s) (iib). Additionally, the composition of the invention can also comprise further additives (ii) other than the UV stabiliser(s) (iia) and/or antioxidant(s) (iib).

The hindered amine compound of UV stabiliser(s) (iia) is preferably present in an amount of 0.1 to 1.0, preferably 0.2 to 1.0, preferably 0.3 to 0.8, preferably 0.4 to 0.7, wt % based on the amount (100 wt %) of the polymer composition.

The hindered amine compound of UV stabiliser(s) (iia) is preferably selected from compound containing one or more 2,2,6,6-substituted piperidine moiety or compound containing one or more 2,2-substituted piperazine moiety. Preferably the hindered amine compound (iia) is a compound containing at least two 2,2,6,6-substituted piperidine moieties. Preferably the hindered amine compound comprises more than two moieties of 2,2,6,6-substituted piperidine.

Herein "2,2,6,6-substituted" and "2,2-substituted" mean that the piperidine moiety or, respectively, the piperazine moiety bears substituents at least at given positions and may also contain substituents in other positions as well-known in the field of hindered amine light stabilising additives.

The hindered amine compound of UV stabiliser(s) (iia) preferably comprises more than one piperidine moieties which bear substituents at least at 2,2,6,6-position, wherein the substituents are selected from one or more of (C1-C6) alkyl group and a ring group selected from saturated (C5-C6)cyclic ring group with C-atoms and optionally with one or two hetero atoms selected from N and O; and (C5-C6) aromatic ring group; preferably more than one piperidine moieties which bear substituents at least at 2,2,6,6-position, wherein the substituents are selected from one or more of (C1-C6)alkyl group, preferably from one or more of (C1-C3)alkyl group.

Suitable examples of UV stabiliser(s) (iia) of the invention have e.g. CAS Number 52829-07-9, CAS Number 65447-77-0, CAS Number 192268-64-7, CAS Number 71878-19-8, CAS Number 082451-48-7, CAS Number 193098-40-7, combination product with CAS Numbers 101357-36-2 and 85631-00-1, combination product with CAS Numbers 101544-99-4 and 84696-71-9. UV stabiliser(s) (iia) of the invention are e.g. commercially available and supplied for instance by Sigma-Aldrich, Ciba and Cytec.

The hindered amine compound of UV stabiliser(s) (iia) is preferably a polymeric hindered amine compound. "Polymeric hindered amine compound" means herein that the hindered amine compound of UV stabiliser(s) (iia) has more than two piperidine moieties containing repeating units which bear substituents at least at 2,2,6,6-position.

Preferably, the hindered amine compound of UV stabiliser(s) (iia) has a Molecular weight, $M_n$, of 2000 g/mol or more, preferably of 2000 to 7000 g/mol, preferably 2000 to 5000 g/mol, more preferably 2500 to 4500 g/mol.

Suitable examples of UV stabiliser(s) (iia) of the invention have e.g. CAS Number 52829-07-9, CAS Number 65447-77-0, CAS Number 192268-64-7, CAS Number 082451-48-7, CAS Number 193098-40-7, combination product with CAS Numbers 101357-36-2 and 85631-00-1, combination product with CAS Numbers 101544-99-4 and 84696-71-9. UV stabiliser(s) (iia) of the invention are e.g. commercially available and supplied for instance by Sigma-Aldrich, Ciba and Cytec.

The antioxidant (iib) is preferably in amount of 20 to 3000, 40 to 2000, 40 to 1000, 50 to 500, ppm based on the amount (100 wt %) of the polymer composition.

The antioxidant (iib) is preferably a di((C8-C30))alkyl amine compound optionally bearing a further substituent, more preferably a long chain N,N-dialkylhydroxylamine compound of the formula R1R2NOH (I), wherein R1 and R2 are independently selected from an alkyl group of 8 to 30 carbon atoms.

The antioxidant (iib) is preferably, a di((C10-C25)alkyl) hydroxyl amine compound (I), preferably a di((C15-C22) alkyl)hydroxyl amine compound (I). The composition of the invention may also comprise further antioxidant(s) (iib) which are same or different from the above compound of formula (I). Suitable examples of the antioxidant (iib) of the invention are for example Bis(octadecyl)hydroxylamine compound (CAS Number 143925-92-2), however without limiting thereto. Antioxidant(s) (iib) of the invention are e.g. commercially available and supplied for instance by Sigma-Aldrich.

The polymer of propylene (PP) can also be a mixture of two or more different polymer components of propylene (PP).

The PP polymer can be a homopolymer or copolymer of propylene.

Preferably the PP polymer is at least one copolymer of propylene. More preferably the copolymer of propylene is selected from a heterophasic copolymer of propylene (iPP) which comprises, preferably consists of, a polypropylene matrix component and an elastomeric propylene copolymer component which is dispersed in said polypropylene matrix; or a mixture of two or more, e.g. two such heterophasic copolymers of propylene (iPP) which are different.

"Heterophasic copolymer of propylene (iPP)" is referred herein also as "PP copolymer".

Moreover, said PP copolymer can comprise, preferably consist of, one or more PP copolymer components which are different.

In this embodiment the combination of heterophasic copolymer of propylene (iPP) with the additives (ii) of the invention contributes to a property balance of the invention by further contributing to highly feasible mechanical properties, like high stiffness, which property balance is very desirable in many polypropylene related end applications as stated above or below. Further preferably, in this embodiment, said polymer composition of the invention contributes to one or more, or preferably all, of the following desirable properties: advantageous water intake property, mechanical stability (expressed e.g. HDT) during e.g. lamination, if needed, when producing the article, and at end use application, and/or, also preferably, a very advantageous shrinkage behavior and dimensional stability as indicated by CLTE measurements.

In one preferable embodiment the copolymer of propylene as at least one polymer of propylene (PP) (i) is selected from a heterophasic copolymer of propylene (iPP) which comprises a heterophasic copolymer of propylene (A) which comprises, preferably consists of, a polypropylene matrix component (a1) and an elastomeric propylene copolymer component (a2) which is dispersed in said polypropylene matrix (a1);

and wherein the heterophasic copolymer of propylene (A) has a Melting temperature (Tm) (DSC) of at least 145° C., when measured as described in the specification under Determination methods, and a Vicat softening temperature (Vicat A) of at least 90° C. (according to ASTM D 1525, method A, 50° C./h, 10N).

The polymer (PP) (i) preferably comprises at least one heterophasic copolymer of propylene (iPP) which preferably consists of the heterophasic copolymer of propylene (A).

The heterophasic copolymer of propylene (A) is referred herein also as "PP copolymer (A)". PP copolymer is preferably PP copolymer (A). The composition preferably comprises one or two or more different PP copolymers (A). In one embodiment the composition comprises two or more PP copolymer (A). In another embodiment the composition comprises one PP copolymer (A).

The "polypropylene matrix component (a1)" is referred herein also as "matrix component (a1)". The "elastomeric propylene copolymer component (a2)" is referred herein also as "elastomeric component (a2)".

Generally, a "heterophasic copolymer of propylene" (as used herein in connection to PP copolymer or preferable PP copolymer (A)) is a propylene copolymer comprising a propylene homo polymer or propylene random copolymer matrix component (1) and an elastomeric copolymer component (2) of propylene with one or more of ethylene and/or C4-C8 alpha olefin comonomers, wherein the elastomeric (amorphous) copolymer component (2) is (finely) dispersed in said propylene homo or random copolymer matrix polymer (1).

As well known "comonomer" refers to copolymerisable comonomer units.

The XCS fraction of PP copolymer (or preferable PP copolymer (A)) is regarded herein as the elastomeric component (or preferable elastomeric component (a2)), since the amount of XCS fraction in the matrix component is conventionally markedly lower. For instance, in case the matrix component (or preferable matrix component (a1)) is a homopolymer of propylene, then the amount of the xylene cold soluble (XCS) fraction (amorphous fraction) (wt %) of the heterophasic copolymer of propylene is understood in this application also as the amount of the elastomeric propylene copolymer component present in the PP copolymer (or preferable PP copolymer (A)).

The copolymer of propylene, preferably the PP copolymer, is preferably a propylene copolymer comprising a propylene homo polymer or propylene random copolymer with one or more of ethylene and/or C4-C8 alpha olefin comonomers as the matrix component and an elastomeric copolymer component of propylene with one or more of ethylene and/or C4-C8 alpha olefin comonomers, wherein the elastomeric (amorphous) copolymer component is dispersed in said propylene homo or random copolymer matrix polymer.

The total comonomer content of the copolymer of propylene, preferably of the PP copolymer, is preferably of 0.5 to 20, preferably of 1.0 to 20, wt %, when measured as described in the specification under Determination methods, preferably the comonomer(s) is selected from ethylene and/or C4-C8 alpha olefin comonomers, more preferably from ethylene.

Preferably the polypropylene matrix component of the PP copolymer, preferably PP copolymer (A), is a homopolymer of propylene.

The PP copolymer is preferably PP copolymer (A).

The melting temperature, Tm, of PP copolymer (A) is preferably of 158 to 170, preferably of 160 to 170° C., when measured as described in the specification under Determination methods.

The Vicat softening temperature (Vicat A) of PP copolymer (A) is preferably of at least 100, preferably of 100 to 165, preferably of 110 to 165, preferably 110 to 160° C.

Preferably, the polypropylene matrix (a1) of the PP copolymer (A) is a homopolymer of propylene.

Even more preferably the heterophasic copolymer of propylene (A) has one or more, in any order, preferably all, of the following further properties:
- $MFR_2$ of 0.2 to 20, preferably 0.2 to 15.0, preferably 0.5 to 15, g/10 min when measured according to ISO 1133 (at 230° C. and 2.16 kg load),
- Xylene cold soluble (XCS) fraction in amount of 3 to 40, preferably of 5 to 35, wt %, when measured as described in specification under Determination methods,
- Comonomer content of 0.5 to 20, preferably of 1.0 to 20, wt %, when measured as described in the specification under Determination methods, preferably the comonomer(s) is selected from ethylene and/or C4-C8 alpha olefin comonomers, more preferably from ethylene,
- Tensile modulus of at least 700, preferably of 750 to 2500, preferably of 750 to 2000, MPa, when measured according to IS0178 as described in the specification under Determination methods, and/or
- Density of 900 to 910 kg/m$^3$, when measured as described in the specification under Determination methods.

The polypropylene composition preferably comprises, preferably consists of:
- (i) more than 25 wt %, preferably 30 to 98.8 wt %, preferably 30 to 98.5 wt %, of a polymer of propylene (PP),
- (ii) 0.2 to 5 wt %, preferably of 0.5 to 5 wt %, of additives,
- (iii) 0 to 60 wt %, preferably 0 to 50 wt %, of one or more component selected from filler (iiia), pigment (iiib) and flame retardant (iiic) which are different from additives (ii),
- (iv) 0 to 50 wt % of further polymer component(s) which are different from polymer of propylene (PP) (i)

based on the total amount (100 wt %) of the polypropylene composition.

Accordingly, herein filler (iiia), pigment (iiib) and flame retardant (iiic) are not understood as additives (ii), but defined separately as the optional component (iii). I.e. the optional component (iii) is other than additives (ii). The amount of optional filler (iiia), pigment (iiib) and/or flame retardant (iiic) as component (iii), if present, is/are calculated independently to the total amount (100 wt %) of the polypropylene composition.

Preferably the polypropylene composition preferably comprises at least one or both of component (iii) or (iv).

The optional filler (iiia), if present, is preferably an inorganic filler. The particle size and/or aspect ratio of the filler (iii) can vary as well-known by a skilled person. Preferably, the filler (iii) is selected from one or more of wollastonite, talc or glass fiber. Such filler products are commercial products with varying particle size and/or aspect ratio and can be chosen by a skilled person depending on the desired end article and end application. The filler (iiia) can be e.g. conventional and commercially available. The amount of the filler (iiia), if present, is preferably 1 to 30, preferably 2 to 25, wt % based on the total amount (100 wt %) of the polymer composition.

The optional pigment (iiib), if present, is preferably white pigment. White pigment is preferably $TiO_2$. Such pigments are well known and e.g. available as commercial $TiO_2$ pigment, also referred herein as $TiO_2$. Any carrier medium, e.g. carrier polymer, is calculated to the amount of the pigment. The amount of the pigment, if present, is preferably 2 to 45, preferably 5 to 45, preferably 10 to 45, wt % based on the total amount (100 wt %) of the polymer composition.

The optional flame retardant (iiic), if present, can be e.g. any commercial flame retardant product, preferably a flame retardant comprising inorganic phosphor. The amount of the flame retardant (iiic), if present, is preferably of 1 to 20, preferably 2 to 15, more preferably 3 to 12, wt % based on the amount (100 wt %) of the composition of the invention.

In one embodiment the composition comprises at least the filler (iiia).

The optional further polymer component(s) (iv) can preferably be a plastomer (iva) and/or functionalised polymer (ivb) which both have a well-known meaning.

The optional plastomer (iva), if present, is preferably a copolymer of ethylene with at least one C3 to C10 alpha-olefin. The plastomer (iva), if present, has preferably one or all, preferably all, of the below properties
- a density of 860 to 915, preferably 860 to 910, kg/m$^3$,
- $MFR_2$ of 0.1 to 50, preferably 0.2 to 40 g/10 min (190° C., 2.16 kg), and/or
- the alpha-olefin comonomer is octene.

The optional plastomer (iva), if present, is preferably produced using a metallocene catalyst, which term has a well-known meaning in the prior art. The suitable plastomers (iva) are e.g. commercially available, e.g. plastomer products under tradename QUEO™, supplied by Borealis, or Engage™, supplied by ExxonMobil, Lucene supplied by LG, or Tafmer supplied by Mitsui. If present, then the amount of the optional plastomer (v) is lower than the amount of polymer PP (i).

The optional functionalised polymer (ivb), if present, is a polymer which is functionalised e.g. by grafting. For instance, polar functional groups, such as maleic anhydride (MAH), can be grafted to a polyolefin to form functionalised polymers (ivb) thereof. Functionalised polymers as adhesives are well known in the field of adhesives and can be chosen by a skilled person. The PP polymer (i) is different from optional functionalised polymer (ivb). Herein, the PP polymer (i) of the invention as defined above, below or in claims, is without grafted functional units. I.e. the term PP polymer (i) of the invention is as obtained from polymerisation reactor (reactor-made polymer) and excludes the PP polymer which is grafted with functional groups after the polymerisation. The amount of the optional functionalised polymer (ivb), if present, is preferably of 3 to 30, preferably 3 to 20, preferably 3 to 18, more preferably 4 to 15, wt % based on the amount (100 wt %) of the composition of the invention. If present, then the amount of the optional functionalised polymer(s) (ivb) is less than the amount of PP polymer (i).

In one embodiment the composition comprises at least one of components (iii) or (iv), suitably both component (iii) and component (iv), suitably one, two or more or all of component (iiia), component (iiib), component (iva) or component (ivb).

The amount of the PP polymer (i) is equal or higher than the amount of the optional palstomer (iva) and optional functionalised polymer (ivb). If both of the optional plastomer (iva) and the optional functionalised polymer (ivb) are present, then the amount of PP polymer (i) is higher than the combined amount of the plastomer (iva) and functionalised polymer (ivb).

The composition of the invention can comprise also additives (ii) other than the UV stabiliser(s) (iia) and/or antioxidant(s) (iib). Such additives (ii) are preferably conventional and commercially available, including without limiting to, nucleating agents, clarifiers, brighteners, acid scavengers, as well as slip agents, processing aids etc. Such additives are generally commercially available and are described, for example, in "Plastic Additives Handbook", 5th edition, 2001 of Hans Zweifel.

Each additive (ii) can be used e.g. in conventional amounts. As evident from the claim 1 and dependent claims and from the description above and below the total amount of the additives (ii) including the optional further additives in addition to UV stabiliser(s) (iia), antioxidant (iib) is between 0.2 to 5 wt %, i.e. the amount of the additives (ii) total to 0.2 to 5 wt % of the total amount (100 wt %) of the polypropylene composition. The additives (ii) including optional further additives (ii) do not include one or more component(s) (iii) which are selected from filler (iiia), pigment (iiib) and flame retardant (iiic) which are independently defined. The amount of the one or more component(s) (iii) is defined separately from the amount of the additives (ii) and is calculated to the total amount of the polypropylene composition, Any optional carrier polymers of additives (ii), of optional filler (iiia), of optional pigment (iiib) and/or of optional flame retardant ((iiic), e.g. optional master batches of components (ii), (iiia), (iiib) and/or, respectively, (iiic), together with the carrier polymer, are calculated to the amount of the respective component (ii), (iiia), (iiib) or (iiic) based on the amount (100%) of the composition of the invention.

The polypropylene composition of the invention preferably has an $MFR_2$ of 1.0 to 25.0, preferably of 2.0 to 20, preferably of 3 to 15, g/10 min, when measured according to ISO 1133 (at 230° C. with 2.16 kg load) as defined below under the Determination methods. The polypropylene composition has more preferably $MFR_2$ of 3 to 10 g/10 min.

The polypropylene composition of the invention preferably has a Xylene cold soluble (XCS) content in amount of 5 to 40, preferably 5 to 35%, when measured as defined below under the Determination methods. The XCS of the polypropylene composition is more preferably of 8 to 30%.

The polypropylene composition of the invention preferably has a Vicat softening temperature (Vicat A) of 100 to 165, more preferably of 110 to 160° C., when measured as described below under Determination methods. The Vicat A of the polypropylene composition is more preferably of 120 to 160° C.

The polypropylene composition of the invention preferably has a Tensile modulus of at least 800, preferably of 800 to 3000, preferably of 850 to 2700, MPa, when measured in machine direction (MD) from 200 µm monolayer cast film sample as defined below under the Determination methods. Said Tensile modulus of the polypropylene composition is preferably of 900 to 2300 MPa.

The polymer composition of the invention preferably has a Tensile strength of 20 to 40, preferably of 23 to 37, preferably of 26 to 33, MPa, when measured in machine direction (MD) from 200 µm monolayer cast film sample as defined below under the Determination methods.

The polymer composition of the invention preferably has a % of tensile strength retention selected from one or both, in any order:
  after 2000 hour ageing time at temperature of 120° C., of 80% or more, and
  after 1000 hour ageing time at temperature of 145° C., of 65% or more;
when measured in machine direction (MD) from 200 µm monolayer cast film sample as defined below under the Determination methods.

The polymer composition of the invention preferably has a Tensile Modulus of 1000 to 3000, preferably of 1100 to 2800, preferably of 1100 to 2500, MPa, when measured from an injection moulded sample as defined below under the Determination methods.

PP polymer can be commercially available grade or can be produced e.g. by conventional polymerisation processes and process conditions using e.g. the conventional catalyst system known in the literature.

One feasible polymerisation process including the conditions and catalyst system is generally described below for the PP copolymer, i.e. for the heterophasic copolymer of propylene (iPP), and naturally applies also for the preferable heterophasic copolymer of propylene (A) of the polypropylene composition. It is evident that the below description can be applied to a homopolymer or a random copolymer of polypropylene, as well, whereby said polymers can be polymerised e.g. in optional prepolymerisation reactor following first reactor (preferably loop reactor) and then second reactor (preferably first gas phase reactor) using preferably the conditions as described below.

The polypropylene matrix component of the PP copolymer may be a unimodal or a multimodal random copolymer or homopolymer of propylene which both have a well-known meaning. Multimodal random copolymer or homopolymer of propylene means herein that it has at least two polymer fractions which are different e.g. with one or two of the following properties: 1) weight average molecular weight or 2) MFR. In case of random copolymer of propylene as the matrix component, the copolymer can also be multimodal with respect to 3) comonomer content, optionally in combination with any or both of the above differences 1) and 2).

The matrix component of the PP copolymer can be a homopolymer or random copolymer of propylene. It is preferred that the matrix component of the PP copolymer is a homopolymer of propylene.

Accordingly, it is preferred that all the comonomers as defined above, which are present in the PP copolymer, originate from the elastomeric propylene copolymer component.

It is preferred that the PP copolymer consists of the matrix component and the elastomeric component. The PP copolymer may optionally comprise a prepolymer fraction, as well known in the polymer field. In such case the amount of the prepolymer is calculated to the amount of the matrix component.

As said, the iPP copolymer can be commercially available grade or can be produced e.g. by conventional polymerisation processes.

As to polymerisation of the heterophasic copolymer of propylene, the individual components (matrix and elastomeric components) of PP copolymer can be produced separately and blended mechanically by mixing in a mixer or extruder. However it is preferred that the PP copolymer comprising the matrix component and the elastomeric component are produced in a sequential process, using reactors in serial configuration and operating at different reaction conditions. As a consequence, each fraction prepared in a specific reactor can have its own molecular weight distribution, MFR and/or comonomer content distribution.

The PP copolymer according to this invention is preferably produced in a sequential polymerisation process, i.e. in a multistage process, known in the art, wherein the matrix component is produced at least in one slurry reactor, preferably at least in a slurry reactor, and optionally, and preferably in a subsequent gas phase reactor, and subsequently the elastomeric component is produced at least in one, i.e. one or two, gas phase reactor(s) (gpr), preferably in one gpr.

Accordingly it is preferred that the PP copolymer is produced in a sequential polymerisation process comprising the steps of (a) polymerising propylene and optionally at least one ethylene and/or C4 to C12 α-olefin, preferably propylene as the only monomer, in the presence of a catalyst in a first reactor (R1), (b) transferring the reaction mixture of the polymerised first polypropylene, preferably propylene homopolymer, fraction together with the catalyst, into a second reactor (R2), (c) polymerising in the second reactor (R2) and in the presence of said first polypropylene polymer, propylene and optionally at least one ethylene and/or C4 to C12 α-olefin, preferably propylene as the only monomer, in obtaining thereby the second polypropylene fraction, preferably said second polypropylene fraction is a second propylene homopolymer, whereby said first polypropylene fraction and said second polypropylene fraction form the matrix component of the PP copolymer, (d) transferring the reaction mixture of the polymerised matrix component of step (c) into a third reactor (R3), (e) polymerising in the third reactor (R3) and in the presence of the matrix component obtained in step (c), propylene and at least one ethylene and/or C4 to C12 α-olefin obtaining thereby the elastomeric component of PP copolymer, wherein the elastomeric propylene copolymer component is dispersed in said matrix component.

Optionally the elastomeric component of the PP copolymer can be produced in two reactors, whereby after above step (e), (f) transferring the PP product of step (e) in which the first elastomeric propylene copolymer fraction is dispersed in a fourth reactor (R4), and (g) polymerising in the fourth reactor (R4) and in the presence of the mixture obtained in step (e) propylene and at least one ethylene and/or C4 to C12 α-olefin obtaining thereby the second elastomeric propylene copolymer fraction, whereby the matrix component of step (c) dispersed in the the first elastomeric propylene copolymer fraction and in the second elastomeric propylene copolymer fraction form the PP copolymer.

Preferably between the second reactor (R2) and the third reactor (R3) the monomers are flashed out.

The term "sequential polymerisation process" indicates that the PP copolymer is produced in at least two, like three, reactors connected in series. Accordingly the present process comprises at least a first reactor (R1) and a second reactor (R2), more preferably a first reactor (R1), a second reactor (R2), a third reactor (R3) and optionally a fourth reactor (R4). The term "polymerisation reactor" shall indicate one of the main polymerisation steps. Thus in case the process consists of four polymerisation reactors, this definition does not exclude the option that the overall process comprises for instance a prepolymerisation step in a prepolymerisation reactor. The term "consist of" is only a closing formulation in view of the main polymerisation reactors.

Any prepolymer fraction is counted into the amount of the first polypropylene fraction.

The first reactor (R1) is preferably a slurry reactor (SR) and can be any continuous or simple stirred batch tank reactor or loop reactor operating in bulk or slurry. Bulk means a polymerisation in a reaction medium that comprises of at least 60% (w/w) monomer.

According to the present invention the slurry reactor (SR) is preferably a (bulk) loop reactor (LR).

The second reactor (R2), the third reactor (R3) and the optional fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the optional fourth reactor (R4) are gas phase reactors (GPR). Accordingly for the instant process at least three, namely a slurry reactor (SR), like a loop reactor (LR), a first gas phase reactor (GPR-1), a second gas phase reactor (GPR-2) and an optional a third gas phase reactor (GPR-3) connected in series are used. In case of a prepolymerisation step a prepolymerisation reactor is placed prior to the slurry reactor (SR).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of LyondellBasell.

Preferably, in the instant process for producing the PP copolymer as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the second gas phase reactor (GPR-2) and in the optional third gas phase reactor (GPR-3) are similar to the second reactor (R2) (=first gas phase reactor (GPR-1).

The residence time can vary in the three reactor zones.

In one embodiment of the process for producing the matrix component of the PP copolymer, the residence time in bulk reactor, e.g. loop, is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerisation may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerisation with the catalyst system, as described in detail below, comprising a Ziegler-Natta procatalyst, an external donor and optionally a cocatalyst.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation reaction is typically conducted at a temperature of 10 to 60° C., preferably from 15 to 50° C., and more preferably from 20 to 45° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerisation conditions and reaction parameters is within the skills of the skilled person.

After the PP copolymer has been removed from the last polymerisation stage, it is preferably subjected to process steps for removing the residual hydrocarbons from the polymer. Such processes are well known in the art and can include pressure reduction steps, purging steps, stripping steps, extraction steps and so on. Also combinations of different steps are possible. After the removal of residual hydrocarbons the PP copolymer is preferably mixed with additives as it is well known in the art. Such additives are described below under the polymer composition of the invention. The polymer particles are then extruded to pellets as it is known in the art. Preferably co-rotating twin screw extruder is used for the extrusion step. Such extruders are manufactured, for instance, by Coperion (Werner & Pfleiderer) and Japan Steel Works.

The PP copolymer of the invention is preferably produced by polymerisation using any suitable Ziegler-Natta type. Typical suitable Ziegler-Natta type catalyst is stereospecific, solid high yield Ziegler-Natta catalyst component comprising as essential components Mg, Ti and Cl. In addition to the solid catalyst a cocatalyst(s) as well external donor(s) are typically used in polymerisation process.

Components of catalyst may be supported on a particulate support, such as inorganic oxide, like silica or alumina, or, usually, the magnesium halide may form the solid support. It is also possible that catalysts components are not supported on an external support, but catalyst is prepared by emulsion-solidification method or by precipitation method. Alternatively the PP copolymer of the invention can be produced using a modified catalyst system as described below.

More preferably, a vinyl compound of the formula (I) is used for the modification of the catalyst:

wherein R1 and R2 together form a 5- or 6-membered saturated, unsaturated or aromatic ring, optionally containing substituents, or independently represent an alkyl group comprising 1 to 4 carbon atoms, whereby in case R1 and R2 form an aromatic ring, the hydrogen atom of the —CHR1R2 moiety is not present.

More preferably, the vinyl compound (I) is selected from: vinyl cycloalkane, preferably vinyl cyclohexane (VCH), vinyl cyclopentane, 3-methyl-1-butene polymer and vinyl-2-methyl cyclohexane polymer. Most preferably the vinyl compound (I) is vinyl cyclohexane (VCH) polymer.

The solid catalyst usually also comprises an electron donor (internal electron donor) and optionally aluminium. Suitable internal electron donors are, among others, esters of carboxylic acids or dicarboxylic acids, like phthalates, maleates, benzoates, citraconates, and succinates, 1,3-diethers or oxygen or nitrogen containing silicon compounds. In addition mixtures of donors can be used.

The cocatalyst typically comprises an aluminium alkyl compound. The aluminium alkyl compound is preferably trialkyl aluminium such as trimethylaluminium, triethylaluminium, tri-isobutylaluminium or tri-n-octylaluminium. However, it may also be an alkylaluminium halide, such as diethylaluminium chloride, dimethylaluminium chloride and ethylaluminium sesquichloride.

Suitable external electron donors used in polymerisation are well known in the art and include ethers, ketones, amines, alcohols, phenols, phosphines and silanes. Silane type external donors are typically organosilane compounds containing Si—OCOR, Si—OR, or Si—NR$_2$ bonds, having silicon as the central atom, and R is an alkyl, alkenyl, aryl, arylalkyl or cycloalkyl with 1-20 carbon atoms are known in the art.

Examples of suitable catalysts and compounds in catalysts are shown in among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, EP 2610271, WO 2012/007430, WO 92/19659, WO 92/19653, WO 92/19658, U.S. Pat. Nos. 4,382,019, 4,435,550, 4,465,782, 4,473,660, 4,560,671, 5,539,067, 5,618,771, EP45975, EP45976, EP45977, WO 95/32994, U.S. Pat. Nos. 4,107,414, 4,186,107, 4,347,1600, 4,472,524, 4,522,930, 4,530,912, 4,532,313, 4,657,882, 4,581,342, 4,657,882.

The obtained PP copolymer is then compounded together with the additives (ii) and one or more of optional components (iii) and (iv) in a known manner. The compounding can be effected in a conventional extruder e.g. as described above and the obtained melt mix is produced to an article or, preferably, pelletised before used for the end application. Part or all of the additives or optional components may be added during the compounding step.

End Applications of the Polymer Composition

The invention is further directed to a use of the polymer composition as defined above or below for producing an article comprising a polymer composition, which comprises (i) more than 25 wt %, preferably from 30 to 99.8 wt % of a polymer of propylene (PP), and (ii) 0.2 to 5 wt % of additives;

based on the total amount (100 wt %) of the polypropylene composition;

wherein the additives (ii) are selected at least from (iia) UV stabiliser(s) comprising hindered amine compound and (iib) antioxidant comprising a dialkyl amine compound, and wherein the additives (ii) are without phenolic unit(s).

The invention also provides an article comprising a polymer composition, which comprises ((i) more than 25 wt %, preferably from 30 to 99.8 wt % of a polymer of propylene (PP), and (ii) 0.2 to 5 wt % of additives;

based on the total amount (100 wt %) of the polypropylene composition;

wherein the additives (ii) are selected at least from (iia) UV stabiliser(s) comprising hindered amine compound and (iib) antioxidant comprising a dialkyl amine compound, and wherein the additives (ii) are without phenolic unit(s).

The article can be any article wherein the properties of the present polymer composition are for instance desirable or feasible. As non-limiting examples of such articles e.g. extruded articles or moulded articles or combinations thereof can be mentioned. For instance the molded articles can be for packaging (including boxes, cases, containers, bottles etc), for household applications, for parts of vehicles, for construction and for electronic devices of any type. Extruded articles can be e.g. films of different types for any purposes, like plastic bags or packages, e.g. wrappers, shrink films etc.; electronic devices of any type comprising the composition, pipes etc. The combinations of molded and extruded article are e.g. molded containers or bottles comprising an extruded label.

Preferably said article is for outdoor use, suitably in conditions wherein the article is exposed to sun light and or high temperatures or marked temperature differences. One of the preferred articles is an electronic device comprising one or more layer(s) comprising, preferably consisting of, the polymer composition of the invention.

The article preferably comprises a layer element which comprises at least one layer comprising the polymer composition of the invention, as defined above or below or in claims.

The layer element can be a monolayer or multilayer element which comprises at least one layer comprising the polymer composition of the invention. A monolayer element can be produced by extrusion, e.g. cast film or blown film extrusion. Layers of a multilayer element can be produced by extrusion, e.g. by coextrusion, by lamination or by a combination of extrusion and lamination. Extrusion and lamination processes are well-known in the art.

Furthermore, the article can comprise one layer element or two or more layer elements. In case of two or more layer elements, at least one of the layer elements comprises at least one layer comprising the polymer composition of the invention, as defined above or below or in claims.

In one embodiment the article comprises a layer element comprising at least one layer which comprises the polymer composition of the invention, as defined above or below or in claims.

Moreover, the layer element comprising at least one layer which comprises the polymer composition of the invention, is preferably selected from a monolayer element comprising the polypropylene composition of the invention, or a multilayer element wherein at least one layer comprises the polypropylene composition of the invention.

Preferably, said at least one layer of the layer element of the article of the invention comprises at least 70 wt %, preferably at least 80 wt %, preferably at least 90 wt %, preferably 90 to 100 wt %, preferably consists of, the polymer composition of the invention.

Preferably, the monolayer element of the article of the invention comprises at least 70 wt %, preferably at least 80 wt %, preferably at least 90 wt %, preferably 90 to 100 wt %, preferably consists of, the polymer composition of the invention.

Also preferably, the multilayer element of the article of the invention comprises at least 35, preferably at least 50 wt %, preferably at least 60 wt %, preferably at least 60 to 100 wt %, preferably at least 60 to 100 wt %, preferably at least 70 to 100 wt %, of the polymer composition of the invention.

In this embodiment the layer element of the article is preferably a film for various end applications e.g. for packaging applications without limiting thereto. In this invention the term "film" covers also thicker sheet structures e.g. for thermoforming.

In this embodiment the layer element of an article of the invention is preferably a film which is selected from a monolayer film comprising, preferably consisting of, the polymer composition of the invention, or a multilayer film wherein at least one layer comprises, preferably consists of, the polymer composition of the invention; as defined above or below or in claims.

The monolayer film can be produced by extrusion, e.g. cast or blow moulding extrusion. In case of multilayer film the film can be produced by extrusion, e.g. coextrusion, or by lamination, preferably by coextrusion.

In a further preferable embodiment the article which comprises one or more layer elements, preferably the article is an assembly comprising two or more layer elements, wherein at least one layer element is a layer element comprising at least one layer which comprises, preferably consists of, the polymer composition of the invention; as defined above or below or in claims, preferably, wherein the at least one layer element is selected from a monolayer element comprising, preferably consisting of, the polypropylene composition of the invention; as defined above or below or in claims, or a multilayer element wherein at least one layer comprises, preferably consists of, the polymer composition of the invention; as defined above or below or in claims of the invention.

A preferred assembly is an electronic device comprising two or more layer elements, wherein at least one layer element is a layer element comprising at least one layer which comprises, preferably consists of, the polymer composition of the invention; as defined above or below or in claims, preferably, wherein the at least one layer element is selected from a monolayer element comprising, preferably consisting of, the polypropylene composition of the invention; as defined above or below or in claims, or a multilayer element wherein at least one layer comprises, preferably consists of, the polymer composition of the invention; as defined above or below or in claims of the invention. Such article, preferably an assembly, more preferably an electronic device is preferably at end use application wherein it is exposed to sun light and/or high temperature changes.

In case of an article with two or more layer elements, wherein at least one layer element is a layer element comprising at least one layer which comprises the polymer composition of the invention, then any of the layer elements or part of the layers thereof can be produced by extrusion, e.g. coextrusion, or lamination, depending on the desired end application, as well known in the art.

The invention further provides a process for producing an assembly of the invention wherein the process comprises the steps of:

assembling the layer element (LE) and further layer element(s) to an assembly;

laminating the elements of the assembly in elevated temperature to adhere the elements together; and recovering the obtained assembly.

The layer elements can be provided separately to the assembling step. Or, alternatively, part of the layer elements or part of the layers of two layer elements can be adhered together, i.e. integrated, already before providing to the assembling step.

The thickness of the layer element and in case of multilayer element, the thickness of the individual layers of the element, can vary depending on the end application, as evident for a skilled person. As an example only, the thickness of the layer element of the invention can be e.g. 0.02 to 5 mm, preferably 0.05 to 3 mm. Moreover, as an example only, the thickness of the at least one layer of the layer element can be 5.0 to 400 µm.

Determination Methods

Melt Flow Rate: The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is measured at a temperature 230° C. and a load of 2.16 kg. The $MFR_2$ of polyethylene is measured at a temperature 190° C. and a load of 2.16 kg Density: ISO 1183, measured on compression moulded plaques Comonomer content: The comonomer content was determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 micrometer and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Specifically, the butene or hexene content of a polypropylene copolymer is determined using the baseline corrected peak area of the quantitative bands found at 1377-1379 $cm^{-1}$. Quantitative results are obtained based upon reference to the film thickness.

The comonomer content is herein assumed to follow the mixing rule (equation 2):

$$C_b = w_1 \cdot C_1 + w_2 \cdot C_2 \qquad (eq.\ 2)$$

Where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \qquad (eq.\ 3)$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

Melting temperature ($T_m$) and heat of fusion ($H_f$): measured with Mettler TA820 differential scanning calorimetry (DSC) on 5 to 10 mg samples. DSC is run according to ISO 3146/part 3/method C2 in a heat/cool/heat cycle with a scan rate of 10° C./min (heating and cooling) in the temperature range of +23 to +210° C. The melting temperature and heat of fusion ($H_f$) are determined from the second heating step. The melting temperatures were taken as the peaks of endotherms.

Xylene cold soluble (XCS): The amount of xylene cold soluble fraction was determined according to ISO 16152. The amount of polymer which remains dissolved at 25° C. after cooling is given as the amount of xylene soluble polymer.

The content of xylene soluble polymer is herein assumed to follow the mixing rule (equation 4):

$$XS_b = w_1 \cdot XS_1 + w_2 \cdot XS_2 \qquad (eq.\ 4)$$

Where XCS is the content of xylene soluble polymer in weight-%, w is the weight fraction of the component in the mixture and subscripts b, 1 and 2 refer to the overall mixture, component 1 and component 2, respectively.

Vicat Softening Temperature: measured according to ASTM D 1525 method A (50° C./h, 10N).

Tensile Modulus; Tensile Stress at Yield and Tensile Strain at Break:

Injection Moulded Specimens: are prepared as described in EN ISO 1873-2 (dog bone shape, 4 mm thickness) and measured according to ISO 527-2 (cross head speed=1 mm/min; 23° C.) for injection molded sample specimen Monolayer Film Samples: are prepared as prepared below under "Film preparation" specified below and measured according to ISO 527-3 using the below given conditions.

Monolayer Film Preparation: 200 µm cast films were prepared on a Plastic Maschinenbau extruder with 3 heating zones equipped with a PP screw with a diameter of 30 mm, a 200 mm die with a die gap of 0.5 mm. The melt temperature of 250° C. and a chill roll temperature of 60° C. were used Film Samples (200 µm Monolayer): Before the first test, the film sample must be stored at 23° C./50% RH over a period of 96 hours. The test specimen shall be cut with a film cutter so that the edges are smooth, free from notches and have an exact width. The form of test specimen is a strip 15 mm wide and not less than 150 mm long. The specimens were cut in machine direction.

Test Conditions Film Tensile Test: The test is performed according to ISO 527-3 using the following test condition set:

Test conditions: 23° C./50% RH
Preload: app. 0.2N
Speed of preload: 2 mm/min
Speed of E-Modulus: 1 mm/min
Speed of testing: 200 mm/min
Clamping distance: 100 mm
Start of E-Modulus testing: 0.05%
End of E-Modulus testing: 0.25%

Oven Ageing of Injection Moulded Specimes and Determination of Tensile Strength Retention To determine the long-term thermal stability (retention of tensile strength) injection moulded specimens were aged in an oven using a temperature of 120° C. for 2000 h and at 145° C. for 1000 has indicated above or below in context.

The tensile strength retention (%) was calculated as:

$$\text{tensile strength retention (\%)} = \frac{\text{tensile strength of aged sample} * 100}{\text{tensile strength of parent sample}}$$

Experimental Part

Polymerisation process of the components heterophasic copolymer of propylene (A) component (referred below as iPP (A) below examples of tables).

Catalyst Preparation

Catalyst preparation for iPP (A) component:
First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of diethylhexylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491 566, EP 591 224 and EP 586 390.

Then triethylaluminium (TEAL), dicyclopentyldimethoxysilane (DCPDMS) as donor (Do), catalyst as produced above and vinylcyclohexane (VCH) were added into oil, like mineral oil, e.g. Technol 68 (kinematic viscosity at 40° C. 62-74 cSt), in amounts so that Al/Ti was 3-4 mol/mol, Al/Do was as well 3-4 mol/mol, and weight ratio of VCH/solid catalyst was 1:1. The mixture was heated to 60-65° C. and allowed to react until the content of the unreacted vinylcyclohexane in the reaction mixture was less than 1000 ppm. Catalyst concentration in the final oil-catalyst slurry was 10-20 wt %.

Preparation of Glass Laminates

Laminates were prepared using a PEnergy L036LAB vacuum laminator. Sample structure from bottom to top was 15*15 $cm^2$ front protective glass element (structured solar glass, 3.2 mm thickness, cleaned with isopropanol before putting the first EVA layer element on the glass), 2 layers of EVA (Hangzhou First EVA F806) cut in the same dimensions as the front protective glass element, 1 layer of PP monolayer film (200 μm) cut in the same dimensions as the front protective glass element. Samples were further vacuum laminated at 150° C. using a lamination cycle program of 5 minutes evacuation time, followed by 10 minutes pressing time with an upper chamber pressure of 800 mbar.

Ageing of Glass Laminates and Discoloration Measurement

The glass laminates were aged in a climate chamber at 85° C. and 85% relative humidity for 2000 hours.

The samples were allowed to cool off at room temperature for 1 h before the color measurement was done.

The color measurements were done using a tristimulus colorimeter from Dr. Lange (Model: LMC6). Measurements and calculation of discoloring index (DI) were done according to ASTM E313-15 (light source: D65, 10 degrees). The laminate is put on the white standard tile (LZM 076, provided by the equipment supplier) with the glass side facing upwards. The discolouring measurement is performed by placing the measuring head on top of the glass.

Delta $DI$(time×hours)=$DI$ time×hours−$DI$ time 0 hours

Polymerisation Examples

All Pilot scale polymers were produced with a prepolymerisation reactor, one slurry loop reactor and two gas phase reactors.

Catalyst Feeding

Catalyst was fed continuously to the polymerisation in oil slurry by the piston pump.

Co-catalyst and Donor

Triethylaluminium (TEAL) was used as a co-catalyst and dicyclopentyldimethoxysilane (Donor D) was used as an external donor. Actual TEAL and donor feeds are given in table 1.

Prepolymerisation Reactor

The catalyst was flushed with propylene to the prepolymerisation reactor in which also TEAL and D-donor were fed. Prepolymerisation reactor, CSTR was operated at 30° C. and 55 barg pressure. The residence time of the particles in propylene slurry was about 0.38 h.

Loop Reactor

The prepolymerised catalyst component was used in loop reactor and gas phase reactors (GPR) connected in series. The process conditions for the loop reactor are given in table 1.

Gas Phase Reactor 1

Polymer slurry was fed from loop to the gas phase reactor (GPR1) as a direct feed without flash. GPR operating temperatures and pressures are given in table 1.

Gas Phase Reactor 2

The product was transferred from GPR1 to GPR2 as an indirect feed via a flash tank. GPR operating temperatures and pressures are given in table 1.

Product Control

The production split between loop and GPR was controlled to be close to 50/50%. The MFR (2, 16 kg/230° C.) was controlled by hydrogen feed.

Final iPP (A) component

The polymer powder obtained from GPR2 was further melt homogenised and pelletized using a Coperion ZSK57 co-rotating twin screw extruder with screw diameter 57 mm and L/D 22. Screw speed was 200 rpm and barrel temperature 200-220° C.

For iPP (A), the following additives were added during the melt homogenisation step: 1500 ppm ADK-STAB A-612 (supplied by Adeka Corporation) and 300 ppm Synthetic hydrotalcite (ADK STAB HT supplied by Adeka Corporation).

TABLE 1

| Polymerisation conditions | iPP (A) |
| --- | --- |
| TEAL/Ti [mol/mol] | 78 |
| TEAL/Donor [mol/mol] | 12 |
| TEAL/C3 [g/t] | 180 |
| Donor/C3 [g/t] | 30 |
| Prepolymerisation | |
| B1 Temperature [° C.] | 30 |
| Loop | |
| B2 Temperature [° C.] | 85 |
| B2 Pressure (barg) | 55 |
| B2 H2/C3 ratio [mol/kmol] | 1.4 |
| B2 Split [%] | 43.7 |
| GPR1 | |
| B3 Temperature [° C.] | 85 |
| B3 Pressure (barg) | 23 |
| B3 H2/C3 ratio (mol/kmol) | 17 |
| B3 split [%] | 43.7 |
| GPR2 | |
| B4 Temperature (° C.) | 71 |
| B4 Pressure (barg) | 17 |
| B4 C2/C3 ratio [mol/kmol] | 480 |
| B4 H2/C2 ratio [mol/kmol] | 460 |
| B4 split [%] | 12.6 |
| Final product | |
| MFR$_2$ [g/10 min] | 3 |
| Ethene comonomer content [wt. %] | 3.6 |
| XCS [wt. %] | 14 |
| Melting temp., Tm [° C.] | 165 |
| Vicat A [° C.] | 154 |
| Density [kg/m$^3$] | 905 |
| Tensile modulus | 1500 |

Further components of the inventive and comparative PP polymer compositions:

Inventive UV stabiliser (iia): STAB 1: Cas number 65447-77-0

Inventive UV stabiliser (iia): STAB 2: Cas number 52829-07-9

Inventive UV stabiliser (iia): STAB 3: Cas number 71 878-1 9-8 (70624-18-9 (US))

Inventive UV stabiliser (iia): STAB 4: Cas number 192268-64-7

Inventive Antioxidant (iib): A01: Cas number 143925-92-2

Other Antioxidant (ii): A02 Cas number 31570-04-4

Comparative Antioxidant: Phenolic Antioxidant: PAO1 Cas number 6683-19-8

Other Additive (ii): CaStearate: Cas number 31570-04-4

Filler (iiia) 1: Conventional commercial Talc product.

Preparation of the Inventive and Comparative PP Polymer Compositions. The compositions were prepared by compounding the polymers with the other components on a co-rotating twin-screw extruder (ZSK32, Coperion) using a screw speed of 400 rpm and a throughput of 90-100 kg/h. The melt temperature ranged from 190-220° C. The components and the amounts thereof are given below under table 2.

The reference comparative compositions CE1 to CE2 are identified in table 2 below.

TABLE 2

Inventive PP polymer compositions IE1 to IE7 and comparative PP compositions CE1 to CE2

| Components of compositions | | IE1 | IE2 | CE1 | IE3 | IE4 | IE5 | IE6 | IE7 | CE2 | IE8 | IE9 |
| --- | --- | --- | --- | --- | --- | --- | --- | --- | --- | --- | --- | --- |
| PP (A) powder | wt % | 98.90 | 98.65 | 99.60 | 98.90 | 98.65 | 98.90 | 98.65 | 78.90 | 79.60 | 78.90 | 78.90 |
| Filler (iiia) Talc | wt % | | | | | | | | 20 | 20 | 20 | 20 |
| Additive (iia) STAB 1 | wt % | 0.25 | 0.5 | 0.25 | | | | | 0.25 | 0.25 | | |
| Additive (iia) STAB 2 | wt % | | | | 0.25 | 0.5 | | | | | 0.25 | |
| Additive (iia) STAB 3 | wt % | | | | | | 0.25 | 0.5 | | | | 0.25 |
| Comparative additive PAO1 | wt % | | | 0.10 | | | | | | 0.10 | | |
| Additive (ii) AO 2 | wt % | 0.25 | 0.25 | 0.05 | 0.25 | 0.25 | 0.25 | 0.25 | 0.25 | 0.04 | 0.25 | 0.25 |
| Additive (iia) STAB 4 | wt % | 0.16 | 0.16 | | 0.16 | 0.16 | 0.16 | 0.16 | 0.16 | | 0.16 | 0.16 |
| Additive (iib) AO 1 | wt % | 0.02 | 0.02 | | 0.02 | 0.02 | 0.02 | 0.02 | 0.02 | | 0.02 | 0.20 |
| Additive (ii) CaStearate | wt % | 0.17 | 0.17 | | 0.17 | 0.17 | 0.17 | 0.17 | 0.17 | | 0.17 | 0.17 |

TABLE 2-continued

Inventive PP polymer compositions IE1 to IE7 and comparative PP compositions CE1 to CE2

| Components of compositions | | IE1 | IE2 | CE1 | IE3 | IE4 | IE5 | IE6 | IE7 | CE2 | IE8 | IE9 |
|---|---|---|---|---|---|---|---|---|---|---|---|---|
| MFR2 | g/10 min | 3.0 | 3.1 | 2.7 | 3.1 | 3.1 | 3.2 | 3.1 | 3.7 | 3.4 | 3.9 | 3.8 |
| Tensile properties, 200 μm monolayer film, MD: | | | | | | | | | | | | |
| Tensile strain at break | % | 691 | 670 | 754 | 847 | 726 | 675 | 733 | 619 | 614 | 636 | 618 |
| tensile modulus | MPa | 1406 | 1456 | 1157 | 1111 | 1098 | 1165 | 1023 | 2050 | 2139 | 2114 | 2142 |
| tensile strength | MPa | 32 | 32 | 31 | 34 | 30 | 30 | 33 | 29 | 30 | 29 | 29 |
| tensile stress at break | MPa | 28 | 28 | 29 | 34 | 29 | 28 | 32 | 27 | 27 | 27 | 26 |

TABLE 3

Inventive PP polymer compositions IE1 to IE9 and comparative PP compositions CE1 to CE2: laminates with Hangzhou First EVA F806 - results after Damp heat (85%RH, 25° C.)

| | | IE1 | IE2 | CE1 | IE3 | IE4 | IE5 | IE6 | IE7 | CE2 | IE8 | IE9 |
|---|---|---|---|---|---|---|---|---|---|---|---|---|
| DI, 0 hours | | 6.9 | 7.4 | 7.3 | 7.2 | 7.3 | 7.2 | 7.1 | 6.3 | 6.5 | 5.9 | 5.9 |
| DI, (2000 hours) | | 7.9 | 8.4 | 9.8 | 8.1 | 8.2 | 7.9 | 8.3 | 7.4 | 10.6 | 7.3 | 7.0 |
| delta DI (2000 hours) | | 1.0 | 1.0 | 2.5 | 0.8 | 0.9 | 0.8 | 1.2 | 1.1 | 4.0 | 1.5 | 1.1 |
| Tensile strength retention* (after 2000h 120° C.) | % | 102 | 102 | 102 | 102 | 102 | 102 | 103 | 104 | 104 | 105 | 105 |
| Tensile strength retention* (after 2000h 145° C.) | % | 63 | 79 | 75 | 105 | 104 | 97 | 99 | 97 | Fail | 112 | 99 |
| Tensile strength retention* (after 1000h 120° C.) | % | 103 | 104 | 103 | 103 | 104 | 104 | 104 | 105 | 44 | 105 | 106 |
| Tensile strength retention* (after 1000h 145° C.) | % | 79 | 85 | 102 | 103 | 105 | 106 | 105 | 99 | 7 | 80 | 95 |

*Tensile strength retention was measured from on injection moulded test specimen as defined above under "Determination methods"
Fail = Sample failed during oven test
Discoloring index = DI

The invention claimed is:

1. A polypropylene composition comprising:
   (i) more than 25 wt % of a polymer of propylene (PP) being a heterophasic copolymer of propylene (iPP), which comprises a heterophasic copolymer of propylene (A), which comprises:
   a polypropylene matrix component (a1) and
   an elastomeric propylene copolymer component (a2) that is dispersed in said polypropylene matrix (a1), and
   wherein the heterophasic copolymer of propylene (A) has a Melting temperature (Tm) (DSC) of at least 145° C., and a Vicat softening temperature (Vicat A) of at least 90° C. (according to ASTM D 1525, method A, 50° C./h, 10N), and
   (ii) 0.2 to 5 wt % of additives;
   based on the total amount (100 wt %) of the polypropylene composition;
   wherein the additives (ii) are selected from (iia) one or more UV stabiliser(s) comprising a hindered amine compound and (iib) one or more antioxidants comprising a dialkyl amine compound and optionally additives other than UV stabiliser(s) (iia) and antioxidant(s) (iib), and wherein the additives (ii) are without phenolic unit(s).

2. The polypropylene composition according to claim 1, wherein the hindered amine compound of the UV stabiliser(s) (iia) is selected from a compound containing one or more 2,2,6,6-substituted piperidine moiety or a compound containing one or more 2,2-substituted piperazine moiety.

3. The polypropylene composition according to claim 1, wherein the hindered amine compound of the UV stabiliser(s) (iia) bears more than two piperidine moieties which bear substituents at least at 2,2,6,6-position.

4. The polypropylene composition according to claim 1, wherein the hindered amine compound of the UV stabiliser(s) (iia) has a Molecular weight, $M_n$, of 2000 g/mol or more.

5. The polypropylene composition according to claim 1, wherein the hindered amine compound of the UV stabiliser(s) (iia) is present in an amount of 0.1 to 1.0 wt %, based on the amount (100 wt %) of the polymer composition.

6. The polypropylene composition according to claim 1, wherein the antioxidant(s) (iib) is a di((C8-C30))alkyl amine compound.

7. The polypropylene composition according to claim 1, wherein the antioxidant(s) (iib) is present in an amount of 20 to 3000 ppm, based on the amount (100 wt %) of the polymer composition.

8. The polypropylene composition according to claim 1, wherein heterophasic copolymer of propylene (A) has one or more, in any order, of the following further properties:
   $MFR_2$ of 0.2 to 20 g/10 min when measured according to ISO 1133 (at 230° C. and 2.16 kg load),
   Xylene cold soluble (XCS) fraction in amount of 3 to 40 wt %,
   Comonomer content of 0.5 to 20% wt %, wherein the comonomer(s) is selected from ethylene and/or C4-C8 alpha olefin comonomers,
   Tensile modulus of at least 700 MPa, and/or
   Density of 900 to 910 kg/m$^3$.

9. An article comprising the polymer composition according to claim 1.

10. The article according to claim 9, comprising a layer element, wherein said layer element comprises at least one layer comprising the polymer composition.

11. The article according to claim 9, which comprises a layer element comprising at least one layer which comprises the polymer composition wherein the layer element is selected from:
   a monolayer element comprising the polypropylene composition, or
   a multilayer element wherein at least one layer comprises the polypropylene composition.

12. The article according to claim 9, which is a film selected from:
   a monolayer film comprising the polypropylene composition, or
   a multilayer film wherein at least one layer comprises the polypropylene composition.

13. The article according to claim 9, which is a multilayer assembly comprising two or more layer elements, wherein at least one layer element is a layer element comprising at least one layer which comprises the polymer composition, wherein the at least one layer element is selected from:
   a monolayer element comprising the polypropylene composition, or
   a multilayer element wherein at least one layer comprises the polymer composition.

* * * * *